Nov. 10, 1964    S. WARNER    3,156,037
ARMATURE WIRE STAKING AND CUTTING MACHINE
Filed April 19, 1961    3 Sheets-Sheet 1
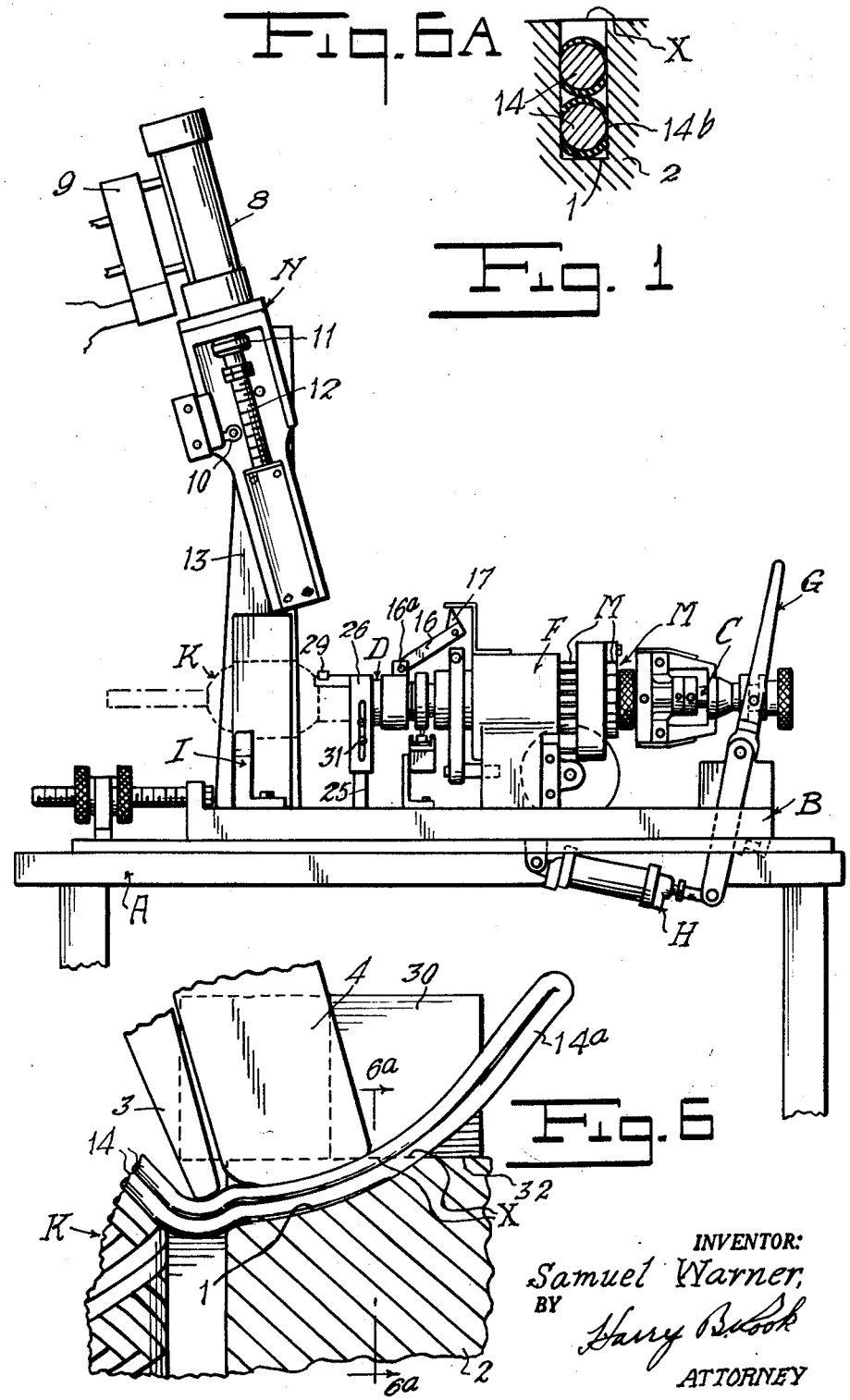

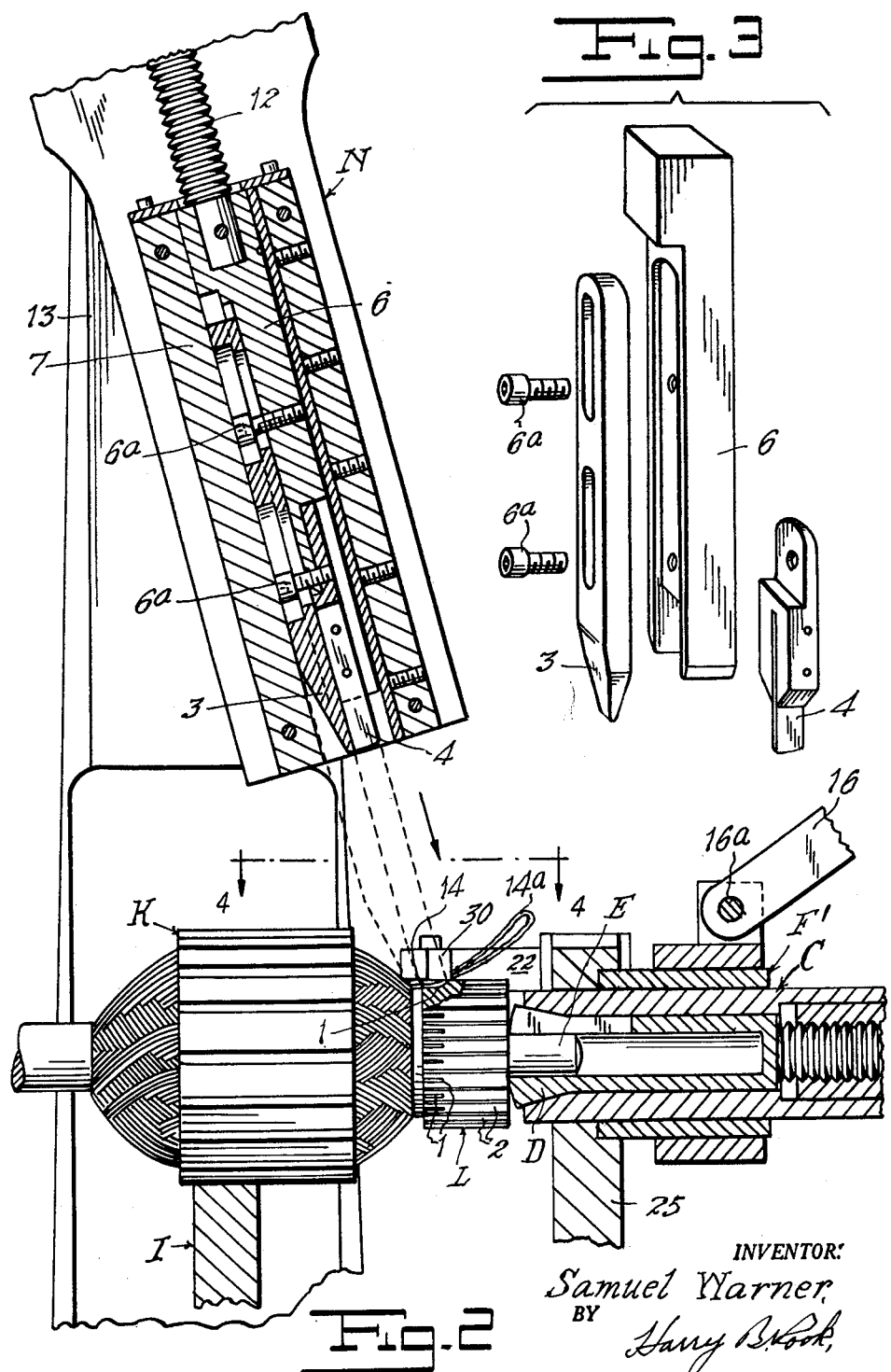

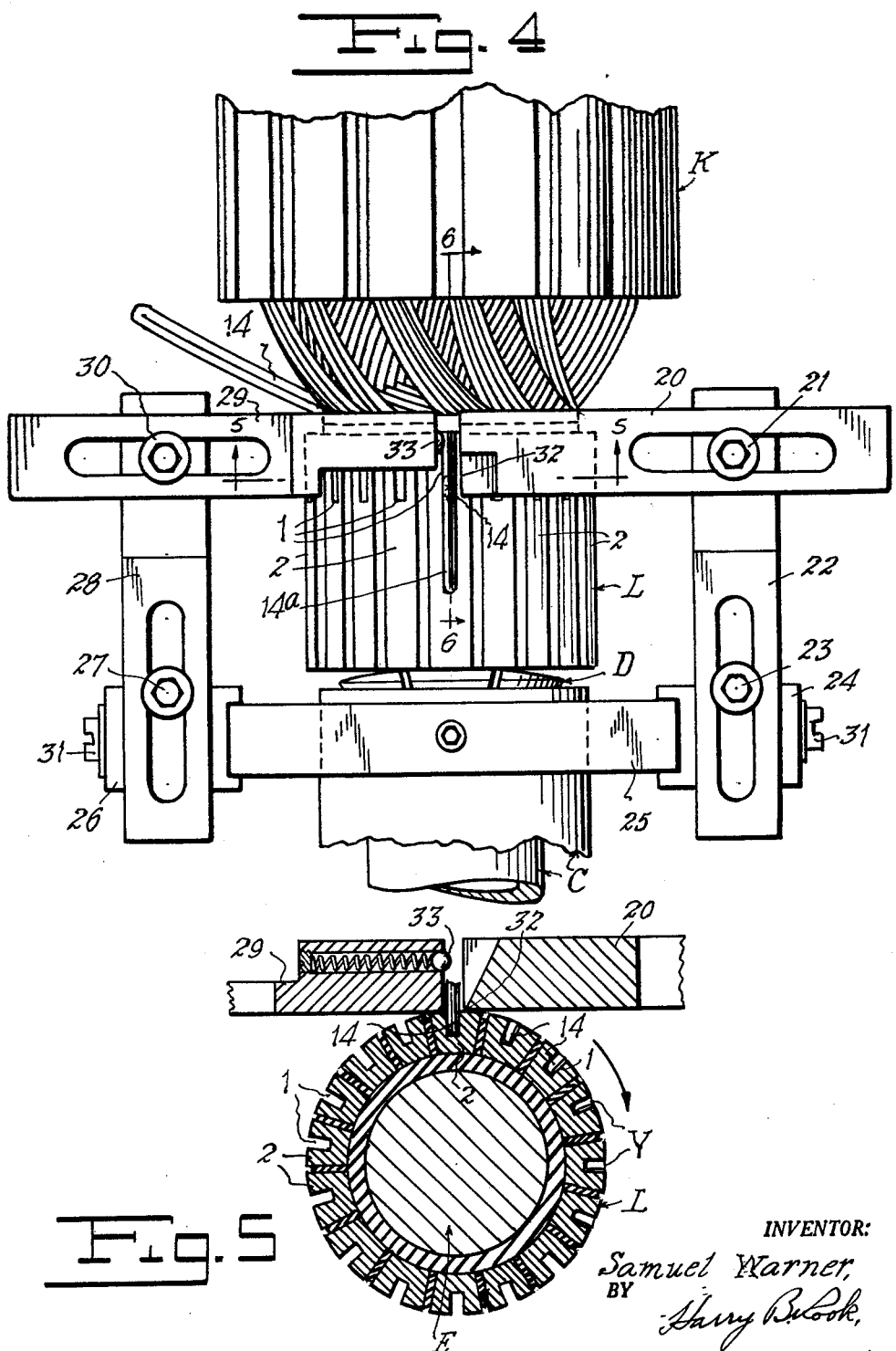

3,156,037
ARMATURE WIRE STAKING AND CUTTING MACHINE
Samuel Warner, Hillside, N.J., assignor to Samuel Warner, Harold Jacobs and Kurt Uglig, as trustees
Filed Apr. 19, 1961, Ser. No. 104,022
4 Claims. (Cl. 29—205)

This invention relates in general to the connection of an armature winding to the commutator bars or segments.

According to known practice in the art, the armature wires covered by a plastic insulating coating are laid in slots in the commutator bars and thereafter firmly secured to the commutator bars by deforming or pressing the metal of the commutator bars over the wires in the slots. Also, the insulation of the portions of the wires to be placed in the commutator slots is removed before the wires are placed in the slots so as to insure proper electrical contact between the wires and the walls of said slots; and the free end portions of the wires that project from the slots are cut off. These practices are frequently referred to as wire staking and cutting operations and they are time consuming, laborious and expensive.

Therefore a primary object of the present invention is to provide a novel and improved method and machine for staking and cutting armature wires wherein the wires shall be automatically bent, formed or shaped and forcibly pressed into the commutator slots and thereafter the ends of the wires shall be severed or cut upon simple rotation of the commutator.

A further object of the invention is to provide a method and apparatus of this character which shall include a novel and improved means for guiding and locating the wires in proper positions above the slots prior to the forcing of the wires into the slots.

Another object is to provide such a method and apparatus wherein the insulation shall be removed from the portions of the armature wires automatically upon and by the forcible pressing of the wires into the commutator slots.

Still another object of the invention is to provide such a method and apparatus wherein a shearing element and the commutator shall be mounted in such relation to each other that upon simple rotation of the commutator, the shearing element will cooperate with the edges of the commutator slots to shear off the ends of the armature wires that project from the slots.

Other objects, advantages and results of the invention will be brought out by the following description in conjunction with the accompanying drawings in which FIGURE 1 is a schematic side elevation of a machine embodying the invention;

FIGURE 2 is an enlarged fragmentary central vertical sectional view through the commutator holding and indexing mechanism, the wire cutting device and the mechanism for forming or bending the wires and pressing or "stuffing" them into the commutator slots, showing the bending and "stuffing" elements in their normal or at rest position in solid lines and in wire staking position in broken lines;

FIGURE 3 is a composite exploded perspective view of the bending element, the stuffing element and the mounting slide therefor;

FIGURE 4 is a fragmentary enlarged top plan view of a portion of the armature and commutator and the wire cutting device, taken approximately on the plane of the line 4—4 of FIGURE 2;

FIGURE 5 is a fragmentary transverse vertical sectional view approximately on the plane of the line 5—5 of FIGURE 4;

FIGURE 6 is a greatly enlarged fragmentary vertical sectional view approximately on the plane of the line 6—6 of FIGURE 4; and FIGURE 6A is a greatly enlarged fragmentary sectional view approximately on the plane of the line 6A—6A of FIGURE 6.

Specifically describing the illustrated embodiment of the invention, the apparatus includes a main frame A having a bed B on the top of which is an armature holding an index mechanism of generally known construction that includes a shaft C on which is mounted a chuck D having a socket in which is releasably clamped one end of the armature-commutator shaft as indicated at E (FIGURE 2), the shaft being journaled in a bearing F on the bed and the chuck mechanism being operated by a lever G that is actuated manually or by power mechanism such as a hydraulic piston and cylinder device H. The bed also has mounted thereon a suitable rest I for supporting the armature K when the end of the armature shaft projecting beyond the commutator L is held in the chuck C as indicated by broken lines in FIGURE 1 and as shown in more detail in FIGURE 2.

The machine also has a suitable indexing mechanism generally designated M by which the armature K can be rotated step by step or indexed to bring the wire-receiving slots of the commutator bars successively into position to be operated upon by the wire bending element 3 and wire stuffing element 4 comprising parts of the wire bending and stuffing mechanism N, which are connected by screws 6a to a carrier slide 6 which is in turn slidably mounted in a guide casing 7 and is reciprocated by a suitable mechanism, preferably a hydraulic piston and cylinder device 8 of generally known construction. Fluid under pressure for the device is admitted to and exhausted from the cylinder by an electromagnetically actuated valve 9, the solenoid of which is partially controlled by a micro-switch 10 which in turn is actuated by a collar 11 on the rod 12 of the piston of the device 8 to the other end of which is connected the carrier slide 6. The wire bending and stuffing mechanism N is mounted on a vertical support 13 that projects upwardly from the frame bed B so that the bending and stuffing elements 3 and 4 are normally disposed above the commutator mounted in the chuck D and upon downward movement thereof, the bending element 3 will engage the wires between the commutator and the armature windings so as to bend the armature wires 14 into the slot 1 of the uppermost commutator bar and the stuffer will force the end portions of the wires downwardly into the slot, as shown by broken lines in FIGURE 2 and better shown in detail in FIGURE 6.

Generally the wires 14 are looped as shown at 14a and of such length that the looped portions project a substantial distance above the commutator bar when the wires are pressed into the commutator slot. The commutator slot is made slightly narrower than the overall diameter of the insulated armature wire so that as the wires are pressed into the slot, the insulation is scraped off the wires by the side walls of the slot as indicated at 14b shown in FIGURE 6 and thereby the conducting portions of the wires within the slot are jammed into tight direct contact with the conducting side walls of the commutator slot. As an example of the relative dimensions of the wires and the slots, it may be pointed out that where the wire with the insulation thereon is of a diameter of .0275 inch, the width of the slot will preferably be .025 inch, so that a substantial pressure must be applied to the stuffing element 4 in order to force the wires into the slot. Thus the wires are tightly fitted in the slots and are supported throughout the lengths of the slots. Moreover, the wires are not nicked or otherwise damaged as frequently happens when the wires are pushed into the slot with a manually operated implement. Thereafter the wires are fused in the slots in the usual way and the insulating material is melted and squeezed out of the slots so that there is a substantially perfect electrical contact between the wires and the commutator bars.

It will be understood that the commutator will be rotated step by step by the indexing mechanism to bring its slots successively into the proper position for the staking operation, and for initially indexing a commutator, an indexing lever 16 may be pivotally mounted at 16a on a stationary support F' for the shaft C and have a narrow indexing blade 17 at its swinging end to enter the slot of the commutator and thus initially locate the commutator in its desired position. The lever 16 normally can be swung into an out-of-the-way position as shown in FIGURE 1.

As an alternative, a plunger may be mounted on the guide support 7 and have a thin edge or point to enter the uppermost commutator slots, the plunger being normally retracted by a spring and the mounting of the plunger being pivotally adjustable so as to swing the point of the plunger horizontally so that the index in the plunger can be used with commutators of different lengths.

After the wires have been staked as described, it is necessary to cut off the loose looped ends 14a of the wires substantially flush with the outer surfaces of the commutator bars, and in accordance with the invention this operation is performed by a cutting device that coacts with the edge of each commutator slot upon rotation of the commutator in one direction, for example, in the direction indicated by the arrow in FIGURE 5 to move the last staked wires out of the staking position, and the next wires to be staked into the staking position.

The cutting or shearing device is shown as comprising a cutter bar 20 that has a bolt and slot connection 21 with a horizontal frame bar 22 that also has a bolt and slot connection 23 with a slide 24 that is vertically adjustably mounted on one end of an auxiliary support block 25 for the chuck D which is secured on the bed B of the frame and has a similar slide 26 adjustably connected to its opposite edge, which in turn has a bolt and slot connection 27 with a frame bar 28 with which a wire latch bar 29 has a bolt and slot connection 30. It will be understood that both the slides 24 have screw and slot connections 31 with the edges of the auxiliary support block 25. The inner end of the latch bar 29 is spaced from the end of the cutter bar 20 a distance slightly greater than the diameter of the wires so as to provide a slot between the latch bar and the cutter bar for guiding and locating the wires in relation to the uppermost commutator slot, whereby the operator can manually pull armature wires through the slot and then release them to be jammed into the commutator slot by the stuffer 4. Thus the operator is not required to waste time and care in manually placing the wires in the commutator slot.

The latch bar has therein a spring pressed ball latch that normally projects from the end of the latch bar to yield and permit the wires to slip past the ball as the wires are pulled into the space between the cutter bar and the latch bar and to normally project from the end of the latch bar into the slot and hold the wires against escape through the slot.

The cutter bar 20 has a cutting or shearing edge 32 that is normallly disposed at the leading side of the commutator slot as the commutator is rotated in the direction of the arrow in FIGURE 5 to bring the slot to the wire staking position shown in FIGURES 2, 4 and 5, the cutter bar being normally positioned so that the cutting edge 32 is closely spaced from the periphery of the commutator bar as best shown in FIGURE 5 and is disposed transversely of the path of movement of the end portions of the commutator wires that project from the slots as shown in FIGURES 4 and 6A so that as the commutator is rotated in the direction of the arrow to move the projecting wires from the staking position, the wires will be sheared between the cutting edge 32 and the trailing side of the commutator slot.

In FIGURES 2, 4, 5 and 6 the looped loose ends of the commutator wires at the staking position are shown after staking but before severance thereof and the lines of severance of the loose ends are shown by broken lines X in FIGURE 6 and by the lines Y in FIGURE 5. In operation of the machine, it will be understood that the indexing mechanism will automatically rotate the commutator step by step by any suitable known means so as to have each step locate one of the commutator slots at the staking position and move another commutator slot with the wires staked therein away from the staking position and into engagement with the cutting edge 32 by which the loose ends of the wires are cut off.

Initially, a whole armature has the armature wires for each commutator projecting away from the commutator as shown at the left-hand side of FIGURE 4 and as each commutator slot is brought to the staking position, the operator grasps the corresponding wires and pulls them between the opposed and spaced apart ends of the cutter bar and the latch bar into alignment with the slot, there being a spring pressed ball latch 33 which yields to permit such insertion of the wires and then snaps into its normal locking position opposite the end of the cutter bar to momentarily hold the wires in that position. The carrier block of the bending and stuffing mechanism N is then moved downwardly and adjusted so that the bending and stuffing elements are properly related to the wires and the slot. The cutter bar and the latch bar are then adjusted and the bending and stuffing elements returned to their normal position. Suitable electrical control mechanism is utilized so that upon the closing of a switch, the mechanism N will be actuated to move the bending and stuffing elements into the staking positions shown by broken lines in FIGURE 6, the descent of the piston rod 12 for actuating the carrier block causing engagement of the collar 11 with the switch 10 so as to actuate the valve 9 and exhaust the fluid from the piston and cylinder device 8. On the return stroke of the piston and cylinder device 8, the indexing mechanism M is actuated by the gear and rack and pawl and ratchet mechanism M' that is generally driven by a piston and cylinder device so as to cause the loose ends of the wires to be cut off and to move the next slot into staking position, whereupon the machine stops to permit the operator to place the wires in proper relation to the next commutator slot for jamming of the wires into the slot by the stuffer element. Obviously the operation is repeated until all the wires have been staked in their respective slots, after which the armature is removed from the chuck.

It will be observed that the wire bending and stuffing elements 3 and 4 are reciprocably mounted on the frame to be located normally in spaced relation to the commutator and movable toward and from the commutator approximately in an axial plane thereof to enter the slot in one of the commutator bars between the spaced apart side walls of the slot upon movement of the stuffing element in one direction, that is, toward the commutator and thereby force into the slot with a jamming action an armature wire placed between the side walls of the slot. It is obvious, therefore, that the bending and stuffing elements need not be mounted above the commutator but could be mounted on either side of or beneath the commutator.

While the now preferred embodiment of the invention has been shown and described, it will be understood that this is primarily for the purpose of illustrating the principles of the invention and that the details of construction of the apparatus may be modified and changed within the spirit and scope of the invention. It will also be understood that any suitable control system can be employed and that as usual there will be an appropriate electrical circuit including switches and relays for controlling the valves for the fluid pressure operated devices.

I claim:

1. A machine for connecting the wires of an armature to corresponding commutator bars having elongated slots with spaced side walls opening through the periphery of the commutator to receive the wires, said machine including a frame, means on the frame for mounting the armature and commutator for rotation about a common axis, means for securing an armature wire in each commutator slot with the end portions of the wires extending from the slots, and cutter means including a cutter edge mounted on said frame fixed in cooperative relation with the edge of a commutator slot to shear said end portions of the wires between said edge of said commutator slot and said cutter edge upon rotation of the commutator.

2. A machine as defined in claim 1 wherein said cutter means for shearing the end portions of the wires includes a cutter bar mounted on said frame and having a cutting edge in closely spaced relation to the periphery of the commutator.

3. A machine as defined in claim 2 with the addition of a latch bar mounted on said frame and having an end juxtaposed to the end of the cutter bar and spaced therefrom a distance slightly greater than the diameter of the wires to define a guide which locates the wires in proper location to a slot in the commutator mounted in the first-mentioned means.

4. A machine as defined in claim 3 wherein there is a spring detent normally projecting into the space between said end of the latch bar and the end of the cutter bar to hold the wires in said proper relation to the commutator slot.

References Cited by the Examiner

UNITED STATES PATENTS

| | | | |
|---|---|---|---|
| 1,831,534 | 11/31 | Judisch | 29—155.54 |
| 2,074,366 | 3/37 | Collins et al. | 29—205 |
| 2,272,263 | 2/42 | Cullin | 29—205 |
| 2,284,373 | 5/42 | Cullin | 29—205 X |
| 2,385,619 | 9/45 | Fausset et al. | 29—205 |
| 2,476,795 | 7/49 | Avigdor | 29—155.54 X |
| 2,572,956 | 10/51 | Servis | 29—155.54 |
| 2,639,396 | 5/53 | Harry | 29—155.54 X |
| 2,669,771 | 2/54 | Burge et al. | 29—205 |
| 2,867,896 | 1/59 | Caldwell | 29—205 |
| 3,002,259 | 10/61 | Fletchter et al. | 29—205 X |

JOHN F. CAMPBELL, *Primary Examiner.*

WHITMORE A. WILTZ, *Examiner.*